Dec. 1, 1953 W. BORBERG 2,660,917
MOTION-PICTURE PROJECTOR, INCLUDING SHUTTER
STRUCTURE FOR PREHEATING FILM
Filed March 2, 1951 2 Sheets-Sheet 2
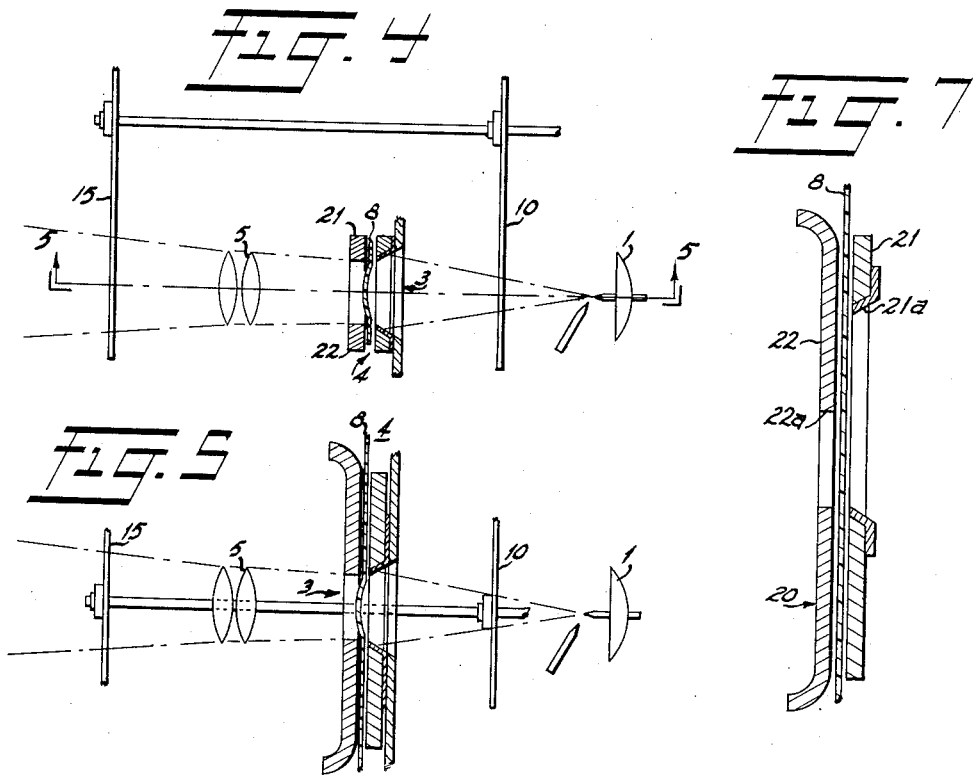
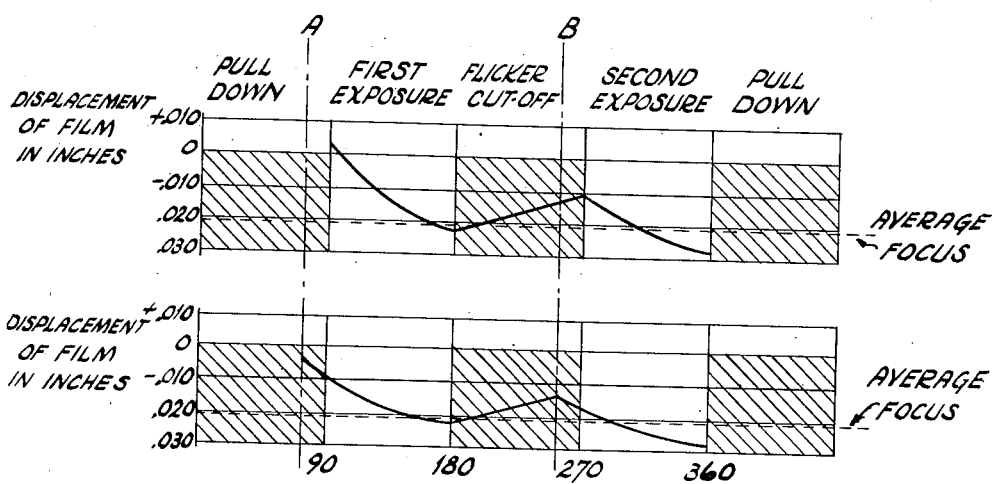
INVENTOR.
WILLY BORBERG
BY
ATTORNEY Patented Dec. 1, 1953

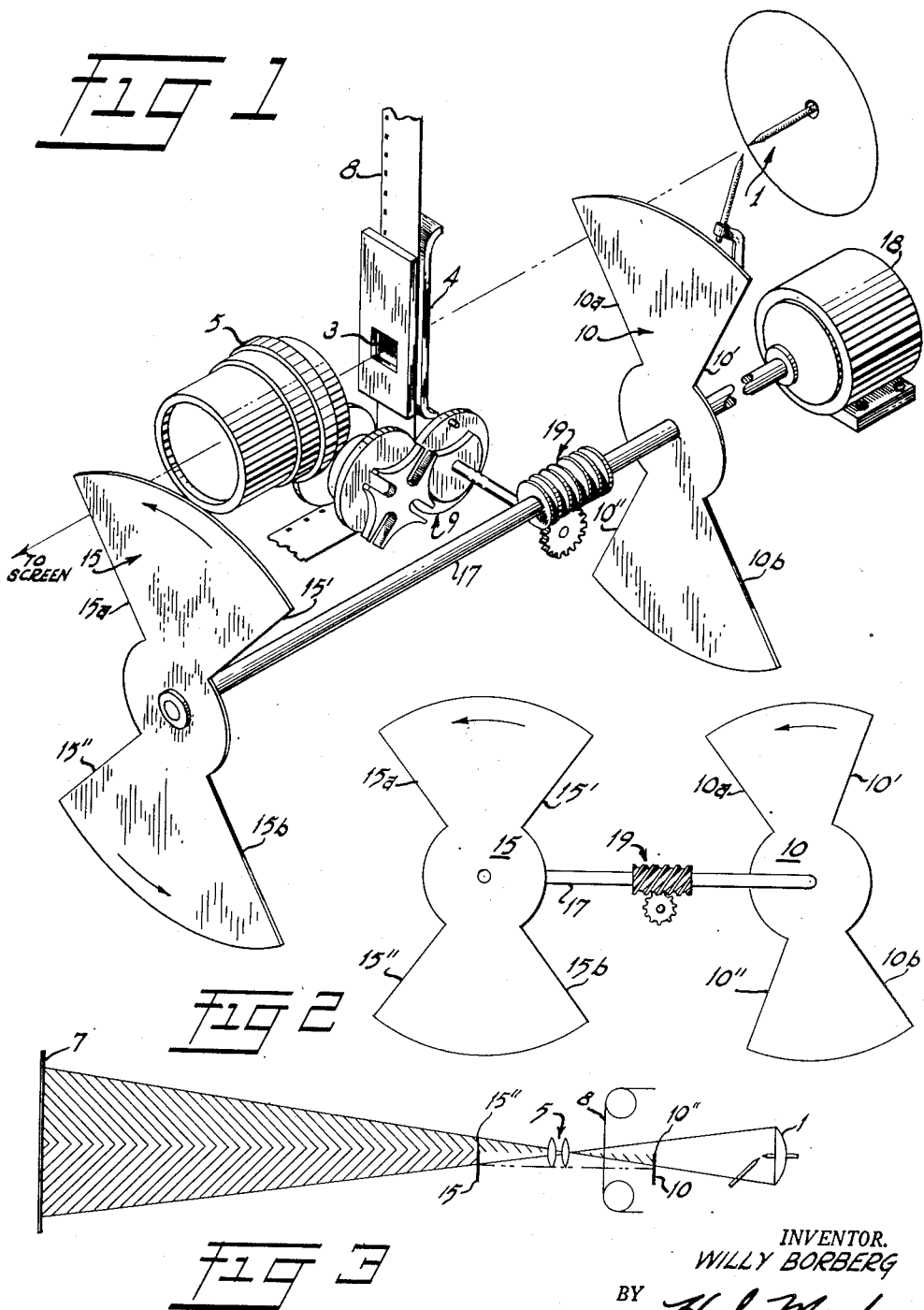

2,660,917

UNITED STATES PATENT OFFICE 2,660,917

MOTION-PICTURE PROJECTOR, INCLUDING SHUTTER STRUCTURE FOR PREHEATING FILM

Willy Borberg, North White Plains, N. Y., assignor to General Precision Laboratory Incorporated, a corporation of New York Application March 2, 1951, Serial No. 213,563

2 Claims. (Cl. 88—18)

This invention relates to an improvement in the art of motion picture projection and is particularly directed to the elimination of problems present in motion picture projectors using high intensity illumination. Usually in large projectors the motion picture film is threaded through the projector so that the emulsion side is toward the source of illumination. The emulsion has a temperature coefficient of expansion different from that of the base of the film and consequently when the film is exposed to the heat of the light source the emulsion expands more than the base thereby producing a bulge in the picture frame which is in the film gate. The bulging action causes the central portion of the picture frame to move in the direction of the optical axis. This bulge is toward the light source because the emulsion side, being next to the light source, absorbs more energy and expands more than the film base. This bulge is commonly referred to in the art as "negative" while the bulge in the opposite direction, towards the projection lens or the screen is referred to as "positive." The individual picture frames, when not subjected to the heat of the light source normally have a positive bulge because when the film is processed, the emulsion shrinks slightly during its setting and drying phase, thus causing the stresses which produce the positive bulge.

In some prior devices a single shutter has been used to accomplish the cut-off. In other instances, two spaced shutters properly associated with the optical system have been utilized for this same purpose. The two shutter projection system lends itself readily to the application of the concept of the present invention. As will be pointed out in the subsequent description, because of the characteristics of the optical system, the two shutters rotating in synchronism cut off the light progressively from the opposite sides of the light beam, thus reducing by substantially one-half the angle of rotation of the shutters necessary to completely cut off the light. The present invention is illustrated as a modification of this type of two-shutter projector for the purpose of accomplishing the ends hereinafter set forth as the objects of the invention.

The invention is by no means limited to the conventional two-shutter projector. In the conventional one-shutter projector, an additional shutter could be added in accordance with the principles outlined herein, the added shutter being represented by one of those illustrated.

In order to reduce the flicker in motion pictures at the rates of projection ordinarily used, the conventional two-bladed motion picture shutter is rotated at such a speed that each picture frame of the film is subjected to two successive light exposures. Accordingly, each frame of the film will be subjected to the heat of the light source at immediately successive time intervals. When the heat from the light strikes the film during the first exposure interval, the film will be heated and will immediately begin to warp from its normal positive position toward the opposite direction. During the immediately succeeding time interval when the light is cut off from the film, the film will begin to cool and proceed to a less negative position, or toward the positive position. Then during the second interval of exposure the heat from the light source will again cause the film to develop a slightly deeper negative buckle. The effect of this is to cause the center of each picture frame as it is presented in the film gate, to oscillate or fluctuate in position along the optical axis of the projector in time phase with the exposure of the film to the light source. Because the center part of the film will be displaced more than the other points of each picture frame, the different points on the film frame area will move toward and away from the projection lens during the projection of the picture on the screen, thereby causing a gradual change in focusing resulting in a blurred image, and thereby producing a displeasing effect to the observer.

Heretofore numerous suggestions have been made for attempting to maintain the individual picture frames in a fixed plane during projection, such as by means of transparent guide plates, and the like. Such devices have an obvious disadvantage of causing deterioration and wear on the film. In a previous application filed by applicant, Serial No. 162,320, filed May 16, 1950, one type of apparatus is shown for overcoming the defocusing action of a high intensity light source.

The present invention contemplates another type of improvement in which the individual film frames are preheated sufficiently to give them an opportunity to come to rest in their warped position before the image is projected on the screen.

Since there is some movement during the exposure period the focus necessarily changes. It is this change of focus during exposure which causes the blurring of the image. The movement of film tends to make points of the image not on the optical axis move transversely of the optical axis thereby giving the appearance of "breathing." The primary object of this invention is to cause the film to approach and remain nearest the "best average focus" during the maximum possible portion of the exposure interval. The present invention can be used with or without auxiliary means for providing air blast to cool and/or position the film in the gate.

Another object is to provide an improved motion picture projector in which the exposure of the film to the light source is controlled so as to cause the predominant range of the fluctuation of the film under the influence of the heat of the light source to be confined during the projection interval to a region so disposed with respect to the "best average focus" as to give maximum sharpness of definition and maximum intensity.

Another object is to provide an improved motion picture projector apparatus in which each film frame is preheated to cause the film to reach a substantially steady state before the image is projected on the screen.

Still another object is to provide an improved motion picture projector apparatus in which the individual picture frames are subjected to the heat of the light source before being projected on the screen.

Other and further objects will become readily apparent from the following description when considered in connection with the accompanying drawings, in which:

Figure 1 is an isometric schematic representation of the essential elements of a motion picture projector embodying the present invention.

Figure 2 is a partial schematic representation of the relative orientation and size of the two shutters employed in connection with the present invention.

Figure 3 is a schematic representation illustrating the optical system and the manner in which the light is controlled.

Figure 4 is a partial plan sectional view illustrating essential components of a motion picture projector embodying the present invention.

Figure 5 is a vertical sectional view on line 5—5 of Fig. 4.

Figure 6 is a graphical comparison of the movement of the centers of the successive motion picture frames in the direction of the optical axis during the exposure periods.

Figure 7 shows a modified form of the invention.

The essential elements of a motion picture projector to which the present invention may be adapted is shown in Fig. 1, where the light source is represented by the high intensity arc lamp carbons 1. A suitable condensing mirror 2 is adapted to concentrate the light from the arc lamp 1 on the aperture 3 in film gate 4. In accordance with conventional practice a projection lens system 5 is adjustable along the optical axis for the purpose of providing the "best average focus" of the picture on the screen 7. The motion picture film 8 is fed across the aperture 3 in the aperture plate 4 by means of a suitable intermittent film feeding mechanism 9 of conventional construction.

The light from the light source 1 is controlled by two shutters 10 and 15 which are fixed to the shaft 17, which is driven by the motor 18. The intermittent film feeding mechanism 9 is driven by the shaft 17 through suitable gearing 19. The ratio of the gearing 19 is such that each picture frame of the film is exposed twice. It is conventional practice where a single two-bladed shutter is used to refer to one of the blades as the pulldown blade and to the other as the flicker blade. In the two-shutter type projector, symbolically represented herein, one blade of each of the shutters cooperates with the optical system to produce the equivalent of the pulldown blade and the flicker blade, respectively, of a single shutter.

The film gate 4 is provided with the usual pressure shoes 21 and 22, which together with the aperture plate guide the lateral edges of the film 8 across the aperture 3 and also provide the necessary friction to maintain the film in a taut condition, the pressure shoes 21 and 22, see Figs. 4 and 5, being spring-biased in accordance with conventional practice.

As is well known even in the most perfect optical system, the image of a plane object or picture is not in a plane surface. Because of the various aberrations of lenses there will be a primary and a secondary image. By proper design of the lens system these images may be made to coincide but their surfaces will be curved. Since the picture screen is usually a plane surface it follows that all portions of a plane object, such as the individual pictures of a motion picture film cannot be in optimum focus. This condition can be partially compensated for if the surface of the object is curved in a direction opposite to the curvature of the image surface.

In motion picture apparatus advantage may be taken of this inherent characteristic by correlating this feature with the inherent fluctuation in curvature of the picture frame in the film gate 4 during the intermittent exposure of the film to the heat of the light source. Instead of attempting to restrain the film against warping as has been attempted heretofore, the present invention contemplates preheating the film so that the film will reach a substantially stable static condition before the picture is projected. As will be seen by referring to Fig. 6, the movement of the center of each picture frame is very rapid at the beginning of the exposure period and then gradually decreases. This is true because, as previously mentioned, the film has a positive bulge during normal temperatures but warps toward a negative bulge when heated. The present invention contemplates moving the displacement curve to the left toward the "best average focus" position, before the projection period is initiated. This position is not necessarily the median position of the range of movement but is the median position of the portion of the range of movement where, to the human eye, the sharpest image is presented during the two immediately successive projection intervals. Obviously, this will vary with the individual installation but the principles of adjustment will be the same in all instances. The simplest method of adjustment is to preheat the film by exposure to the light source before projection, but it is readily conceivable that special heating means could be utilized, if desired, so that no change in the shutter arrangement in a two-shutter projector would be necessary.

Referring to Fig. 2, it is to be noted that the shutters 10 and 15 are fixed to the shaft 17 so that they must always move in synchronism. It is to be assumed that the shaft 17 rotates in a counterclockwise direction as indicated by the arrows in Figs. 1 and 2. As will be explained later, the blades of the rear shutter 10, which is located between the light source 1 and the film 8, are narrower than the blades of shutter 15. Referring specifically to Fig. 3, it will be noted that because the rays of light originating on one side of the optical axis are refracted to the opposite side of the optical axis after they pass through the optical system 5, the blades of the shutter 10 cut off the rays at one side of the optical axis while the blades of shutter 15 cut off the rays from the opposite side of the optical axis. In view of the fact that both of the shutters 10 and 15 are operated in synchronism, it will be seen that the cone of rays progressively diminishes from the opposite sides of the optical axis. By using two shutters, the rear shutter 10 between the light source 1 and the film 8, and the front shutter 15, between the optical system 5 and the screen 7, the cutoff will be effected at twice the rate that it would be if only one of the shutters was used, for the same speed of rotation of a single shutter.

Heretofore, it has been conventional practice in two-shutter projectors to have the blades of both shutters of substantially the same shape and size for the purpose of obtaining fast cutoff. As has been previously mentioned, it is desirable to have the individual picture frames in an almost static condition at the instant that the image is projected on the screen 7. Since the individual picture frames have a normally positive bulge when cooled, it is desirable that the heat from the light source 1 be applied to the individual picture frame as it comes to rest in the film gate 4 to permit it to warm up and reach its substantially stable state before the image is projected on the screen. To this end, the leading edges 10a and 10b of the shutter 10 have the same radial disposition as have the leading edges 15a and 15b of the shutter 15 with respect to the common shaft 17. In other words, the leading edges of the blades of both shutters 10 and 15 are in the same radial plane but the blades of the shutter 10 are narrower than those of shutter 15. Thus, the trailing edges 10' and 10" pass out of the beam of light from the light source 1 before the corresponding edges 15' and 15", respectively, of shutter 15 thereby exposing the film to the light shortly before the image is projected on the screen 7.

Fig. 4 shows the manner in which the picture frame is in a positive bulge position as it enters the film gate 4. Referring again to Fig. 3, assuming the shutters are rotating in the direction of the arrow it will be seen that because the edge 10" is slightly ahead of the edge 15" of blade 15, the film 8 will be exposed to the heat of the light source 1 before the picture is projected on the screen 7. As a result, part of the cone of light from the light source will fall on the film causing it to gradually warm up and begin to warp toward the negative bulge. Although the picture frame may not reach the full negative bulge static state, it will approach the "best average focus" position before the trailing edges 15" of the shutter 15 permit the projection of the image on the screen 7.

Figure 5 illustrates the effect of the heat from the light source 1 in causing the film 8 to move toward the negative position. It will be noted from Fig. 4 and Fig. 5 that the film is curved in both the vertical and horizontal meridians. As the film 8 continues to warm up the picture frame will approach the negative position.

The upper graph of Fig. 6 shows the progressive movement of the center of the picture frame when the period of projection is simultaneous with the period of exposure of the film to the heat of the light source. The lower graph of Fig. 6 illustrates the manner in which the displacement curve is moved to the left when the period of exposure begins at points A and B of the first and second pulldown periods, respectively, before the respective periods of projection. It will readily be seen that when the film is preheated there is a minimum deviation of the position of the center of the film with respect to the best average focus during the exposure periods. It will also be noted that with the preheating of the film 8 the light is not cut off from the film during the complete pulldown period and accordingly the film does not completely cool between the first and second projection. As a result the curve is flatter during the second exposure period thus resulting in a more clearly defined picture throughout a greater portion of the projection periods.

The two-shutter type projector has been used to illustrate the principles of the present invention purely for matter of convenience and because the modification of one of the shutters readily provides the preheating before the projection of the picture. It will be readily apparent that instead of modifying the blades of the rear shutter any suitable preheating means could be provided which is operated in appropriate controlled timed relation with the exposure period. Likewise special heating means could be applied in operable association with a shutter of a single shutter projector, or, alternatively, and additional shutter could be added to a conventional single shutter projector to accomplish the preheating effect.

An example of such an alternative arrangement is illustrated in the embodiment of Fig. 7. In this embodiment a special film gate assembly 20 is provided having a rear plate 21 with an aperture 21a which is long enough in the direction of the length of the film to expose two successive picture frames. A front plate 22 is provided with an aperture 22a which is of a size such as to expose only one picture frame at a time. In other words, the aperture 22a is of the same size as that in the film gate 4 of Fig. 1. Because the film 8 moves downward through the film gate assembly 20, the lower edges of the apertures 21a and 22a are in alignment. Accordingly, since the rear aperture 21a faces the light source (not shown in Fig. 7) two immediately adjacent picture frames will be exposed to the heat and light from the light source.

From the above description it should be obvious that, assuming the film 8 to move downward in the conventional manner, two successive picture frames will be exposed simultaneously to the light source but only the picture frame in front of the aperture 22a will be projected on the screen. Accordingly, while the lower picture frame is being projected, the next succeeding upper picture frame will be warming up under the influence of the heat from the light source and will be approaching its static negatively buckled state. In this way the preheating of the film 8 is so controlled that there is reduced movement of the picture frames during projection without excessive heating of the film. If desired, a suitable heat filter could be placed over the upper part of the aperture 21a to vary the amount of preheating of the picture frames.

Although the exact shape of the curve of displacement will not be identical with that shown in Fig. 6, the result accomplished can be made substantially the same by making appropriate adjustments. It will be seen that in the last embodiment each picture frame may receive as much as the equivalent of four exposures during each projection, depending, of course, upon the amount of light which is permitted to fall on the film frames in the aperture $21a$ during the preheat exposure. Accordingly, the displacement curve during both the first and second exposure periods may more nearly approach the "best average focus" thereby resulting in a much sharper definition at the projected image.

The foregoing description of the two embodiments represents illustrative means for preheating motion picture film so that the film will be in a position approaching the condition which the film would inherently assume during the latter part of a projection period in the conventional motion picture projector. Accordingly, it will be readily apparent that this invention constitutes an improvement of the prior art and it will be clear to anyone skilled in the art that various changes can be made in the invention without departing from the spirit of the invention.

What is claimed is:

1. A motion picture projector comprising a film gate having a projection aperture, means for supporting and intermittently moving a film strip through said film gate for positioning successive film frames over said aperture, a light source, an optical system for projecting images of said film frames, a front shutter having at least two blades positioned between said optical system and the projected images, a rear shutter having the same number of blades as the front shutter positioned between said light source and said projection aperture, said shutters being fixed to a common shaft for simultaneous rotation therewith, the leading edges of the blades of both shutters being positioned in a common radial plane passing through the axis of rotation of said shaft, the blades of said rear shutter being narrower than the blades of the front shutter and their width being such that said rear shutter substantially completely uncovers said aperture to permit the light from the light source to strike said film before said front shutter initiates projection whereby the whole of the individual film frames are preheated before projection is initiated.

2. The combination as set forth in claim 1, in which said projection aperture is substantially the same size as a film frame and wherein the relative width of the blades of said shutters is such that the lagging edges of the blades of said rear shutter permits the light from the light source to strike said film before the front shutter initiates projection progressively from one edge to the other lengthwise of the film, while the aligned leading edges of the blades of the respective shutters causes progressive cut-off of the projection simultaneously from the opposite lengthwise edges toward the center.

WILLY BORBERG.

References Cited in the file of this patent

UNITED STATES PATENTS

| Number | Name | Date |
| --- | --- | --- |
| 917,697 | Woodworth | Apr. 6, 1909 |
| 2,037,453 | Boecking | Apr. 14, 1936 |
| 2,269,713 | Erwin | Jan. 13, 1942 |
| 2,287,996 | Heidegger | June 30, 1942 |
| 2,312,308 | Boecking | Mar. 2, 1943 |
| 2,425,217 | Wienke | Aug. 5, 1947 |